United States Patent
Tsao

(10) Patent No.: US 8,721,275 B2
(45) Date of Patent: May 13, 2014

(54) HEAT DISSIPATION DEVICE

(75) Inventor: Yu-Ho Tsao, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 372 days.

(21) Appl. No.: 13/221,922

(22) Filed: Aug. 31, 2011

(65) Prior Publication Data

US 2012/0168134 A1  Jul. 5, 2012

(30) Foreign Application Priority Data

Dec. 31, 2010  (TW) .............................. 99147270 A

(51) Int. Cl.
*F04D 29/44* (2006.01)
*F04D 29/54* (2006.01)

(52) U.S. Cl.
USPC ....................................... 415/211.2; 415/220

(58) Field of Classification Search
CPC ......... F01D 5/141; F01D 25/30; F01D 25/24; F04D 29/444; F04D 29/441; F04D 29/426; F04D 25/0613; F04D 29/326; F04D 29/445; F04D 29/2244; F04D 19/002; F04D 29/52; F04D 29/522; F04D 29/54; F04D 29/541; F04D 29/545; F04D 29/547; F03B 3/00; F03B 7/003

USPC ................ 415/208.1, 211.2, 182.1, 220, 224, 415/224.5, 225; 454/184; 361/695
See application file for complete search history.

(56) References Cited

U.S. PATENT DOCUMENTS

| 4,969,421 | A  | * | 11/1990 | Haner et al. ............... | 123/41.49 |
| 6,643,131 | B1 |   | 11/2003 | Huang | |
| 7,607,887 | B2 | * | 10/2009 | Yang et al. ................. | 415/213.1 |
| 2003/0007867 | A1 | * | 1/2003 | Chang ......................... | 415/220 |
| 2010/0061060 | A1 |   | 3/2010 | Tien et al. | |

FOREIGN PATENT DOCUMENTS

| CN | 101123863 | 2/2008 |
| CN | 100376806 | 3/2008 |
| CN | 101666320 A | 3/2010 |
| TW | I291321 | 12/2007 |

* cited by examiner

*Primary Examiner* — Edward Look
*Assistant Examiner* — Christopher J Hargitt
(74) *Attorney, Agent, or Firm* — CKC & Partners Co., Ltd.

(57) ABSTRACT

A heat dissipation device includes an axial-flow fan and an air guider. The axial-flow fan has an air inlet and air outlet. The air guider is connected to the air outlet and includes an air input section, an air output section, at least an air divider and at least an arc air divider. The air input section has an area smaller than that of the air outlet. The air output section has an area smaller than that of the air input section. The air divider is located within the air output section to divide the air output section into a plurality of air output channels. The arc air divider is located within the air guider.

12 Claims, 3 Drawing Sheets

HEAT DISSIPATION DEVICE

RELATED APPLICATIONS

This application claims priority to Taiwan Application Serial Number 099147270, filed Dec. 31, 2010, which is herein incorporated by reference.

BACKGROUND

1. Field of Invention

The present invention relates to a heat dissipation device. More particularly, the present invention relates to a heat dissipation device of a projector.

2. Description of Related Art

As the technology advances rapidly, the projectors are more broadly used in a meeting or event conduct. For satisfying a large number of attending members in a meeting or event, a huge screen is required to provide a proper displaying way to communicate message. Therefore, a high-power lamp is essential to the projector, and a better heat dissipation solution is needed for the high-power lamp and required to be developed by a projector manufacturer.

In a conventional projector, a high rotation speed centrifugal fan is installed to cool the high-power lamp. There are uncomfortable noises generated by the projector and the vibrations of the high rotation speed fan reduces the projector's usage life. Besides, this extra blower cannot be utilized to cool other areas within the conventional projector such that additional fans are required to be installed for cooling other areas within the conventional projector. However, multiple fans occupy more space within the projector than a single fan does such that the projector cannot be designed as a compact one, which does not satisfying the current market demands.

For the forgoing reasons, there is a need for designing a customized heat dissipation device for cooling the high-power lamp and other low-power components within the projector without generating too much noises and occupying too much areas.

SUMMARY

It is therefore an objective of the present invention to provide a heat dissipation device so as to deal with the above-discussed problems.

In accordance with the foregoing and other objectives of the present invention, a heat dissipation device includes an axial-flow fan and an air guider. The axial-flow fan has an air inlet and air outlet. The air guider is connected to the air outlet and includes an air input section, an air output section, at least an air divider and at least an arc air divider. The air input section has an area smaller than that of the air outlet. The air output section has an area smaller than that of the air input section. The air divider is located within the air output section to divide the air output section into a plurality of air output channels. The arc air divider is located within the air guider.

According to an embodiment disclosed herein, the air guider further includes a shield part aligned with a hub area of the axial-flow fan.

According to another embodiment disclosed herein, the shield part and the hub area share a common shape.

According to another embodiment disclosed herein, the shield part has a reflective surface, which is opposite to the hub area.

According to another embodiment disclosed herein, the shield part is of a circular shape.

According to another embodiment disclosed herein, the arc air divider and the shield part share a common center According to another embodiment disclosed herein, the air guider comprises at least two fastening holes through which the axial-flow fan is secured.

According to another embodiment disclosed herein, the air input section occupies a half of the air outlet.

According to another embodiment disclosed herein, the air guider has a positioning member so as to secure the fan frame of the axial-flow fan.

According to another embodiment disclosed herein, the positioning member has a hook member at an end thereof.

According to another embodiment disclosed herein, the air output section is disposed along an axial direction of the axial-flow fan.

According to another embodiment disclosed herein, the air output section is disposed along a radial direction of the axial-flow fan.

Thus, the heat dissipation device, consisting of the axial-flow fan and the air guider, is equipped with both functions of cooling the high power component and low power component, thereby occupying less space within an electronic device such that the electronic device can be designed with a compact size. Besides, the air guider is equipped with air dividers to uniform the airflows within the air guider, thereby decelerating the airflows through the air guider and decreasing the noises caused by the airflows, e.g. wind shear sounds.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
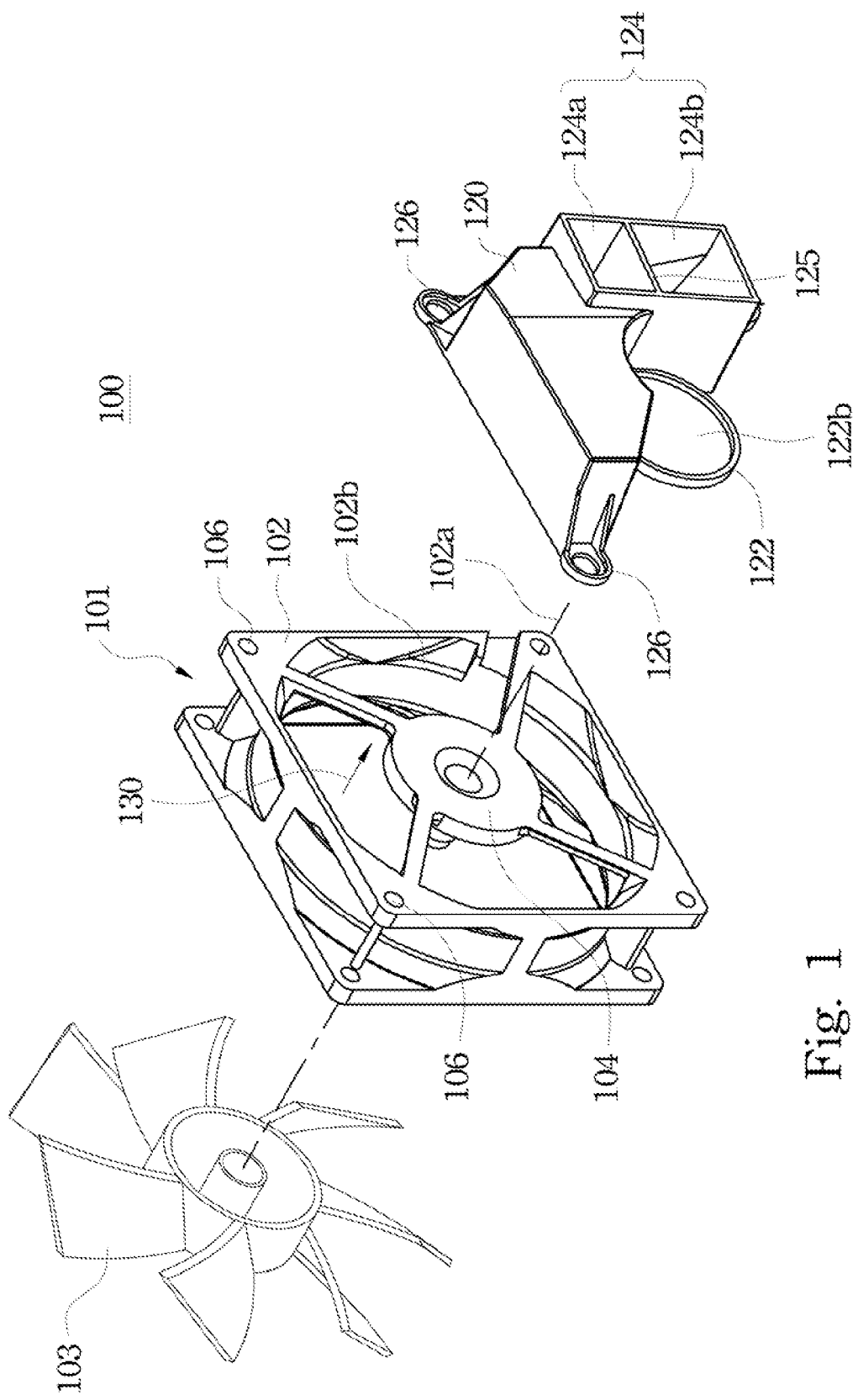
FIG. 1 illustrates an exploded view of a heat dissipation system according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
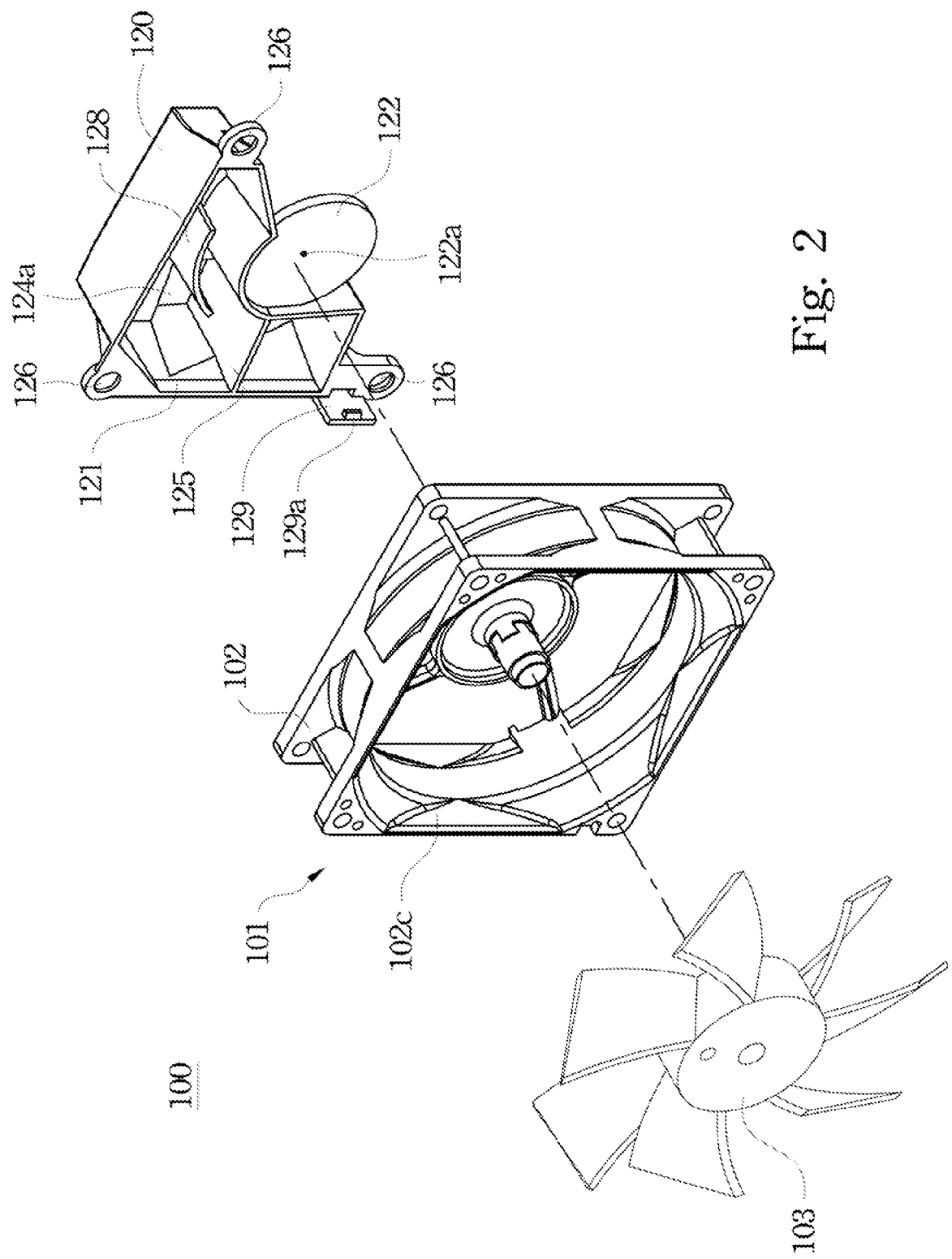
FIG. 2 illustrates an exploded view of the heat dissipation system of FIG. 1 from an opposite viewpoint.

Referring to FIG. 1, which illustrates an exploded view of a heat dissipation system according to one preferred embodiment of this invention. FIG. 2 illustrates an exploded view of the heat dissipation system of FIG. 1 from an opposite viewpoint.

The heat dissipation device 100 includes two major parts: an axial-flow fan 101 and an air guider 120. The "axial-flow fan" is a terminology in the art, which denotes a fan introducing air along an axial direction of its impeller and outputting air along the axial direction of the impeller (i.e. along a direction 130, which is in parallel with a rotation axis 102a). The air guider 120 is to transform part of output airflows of the axial-flow fan 101 into relatively strong airflows for cooling a high-power component within an electronic device (e.g. a high-power lamp within a projector). The heat dissipation device 100 can be, but not limited to, applied to the projector.

The axial-flow fan 101 basically includes a fan frame 102 and an impeller 103. The fan frame 102 has an air inlet 102c (referring to FIG. 2) and an air outlet 102b (referring to FIG. 1). The air guider 120 is secured to the air outlet 102b of the fan frame 102, but only occupies part of the air outlet 102b, not a whole area of the air outlet 102b. Thus, part of airflows, which are introduced into and outputted by the air guider 120, are utilized to cool the high power component, but the remaining airflows, which are outputted by axial-flow fan 101 but not introduced into the air guider 120, are utilized to cool the low power components. With this regard, the heat dissipation device 100 has both functions of cooling the high power component and low power components. In a conventional solution, two types of fans or blowers are required for cooling the high power component and low power components. The heat dissipation device 100 occupies less space within the projector such that the projector can be designed with a thin or compact size.

An air input section 121 of the air guider 120 is secured to the air outlet 102b of the axial-flow fan 101. In this embodiment, the air input section 121 of the air guider 120 occupies about a half of the air outlet 102b of the axial-flow fan 101. It is subject to a designer to decide a desired ratio, e.g. one-fourth or three-fourth, of the air outlet 102b of the axial-flow fan 101 to be occupied by the air input section 121 of the air guider 120.

In this embodiment, the air guider 120 is equipped with three fastening holes 126 through which a fan frame 102 can be fastened by bolts or screws. Three fastening holes 126 of the air guider 120 are aligned with any adjacent three of the four fastening holes 106 of the fan frame 102 such that the air guider 120 can be secured to the fan frame 102 by screwing blots into the fastening holes (106, 126). The fastening holes 126 of the air guider 120 are not limited to three holes, and can be varied according to actual demands. In general, the air guider 120 should be equipped with at least two fastening holes such that the air guider 120 can be firmly secured to the fan frame 102 by screwing two bolts through at least two fastening holes.

In addition, the air guider 120 can also be equipped with a positioning member 129 (referring to FIG. 2). When the positioning member 129 engages with an edge of the fan frame 102, the air guider 120 can be conveniently secured to the fan frame 102 of the axial-flow fan 101 and the fastening holes 126 of the air guider 120 can be easily aligned with the fastening holes 106 of the fan frame 102. The positioning member 129 is equipped with a hook member 129a at its end to be engaged with an edge of the fan frame 102.

The air guider 120 can also be equipped with a shield part 122 in order to prevent the high-power lamp of the projector from overheating an impeller driving means (e.g. a motor) of the axial-flow fan 101. The impeller driving means is installed on a hub area 104 of the fan frame 102. Therefore, when the air guider 120 is secured to the fan frame 102, the shield part 122 is aligned with the hub area 104 of the fan frame 102, thereby stopping the high-power lamp from directly radiating the hub area 104, overheating the impeller driving means and reducing its lifetime. In this embodiment, the shield part 122 and hub area 104 share a common shape, such that the shield part 122 can fully cover the hub area 104 and does not interfere the output airflows of the axial-flow fan 101. The hub area 104 of the fan frame 102 generally has a circular shape, so the shield part 122 is, but not limited to, of the circular shape. To increase a shielding performance of the shield part 122, the shield part 122 has a reflective surface 122b, which is opposite to the hub area 104, thereby reflecting the heat radiation to other places. The reflective surface 122b of the shield part 122 can be, but not limited to, a reflective coating or an aluminum foil.

In order to further decrease the operation noises of the whole heat dissipation device 100, the air guider 120 can be equipped with an arc air divider 128 within, and the air output section 124 of the air guider 120 can be equipped with the air divider 125, to thereby decelerating the airflows through the air guider 120 and decreasing the noises caused by the airflows, e.g. wind shear sounds.

In this embodiment, the arc air divider 128 and the circular shield part 122 can share, but not limited to, a common center 122a, i.e. they are coaxial. One or more arc air dividers 128 may be designed within the air guider 120 according to actual demands so as to uniform the airflows within the air guider 120, thereby decelerating the airflows through the air guider 120 and decreasing the noises caused by the airflows, e.g. wind shear sounds.

The air divider 125 within the air output section 124 is equipped with similar purposes as the arc air divider 128. The air divider 125 divides the air output section 124 into two air output channels (124a; 124b) and uniform the airflows within each air output channel, thereby decreasing the noises caused by the airflows. The air divider 125 is not limited to one, two or more air dividers 125 can also be designed within the air output section 124 to divide the air output section 124 into three or more air output channels.

Figure 3A:
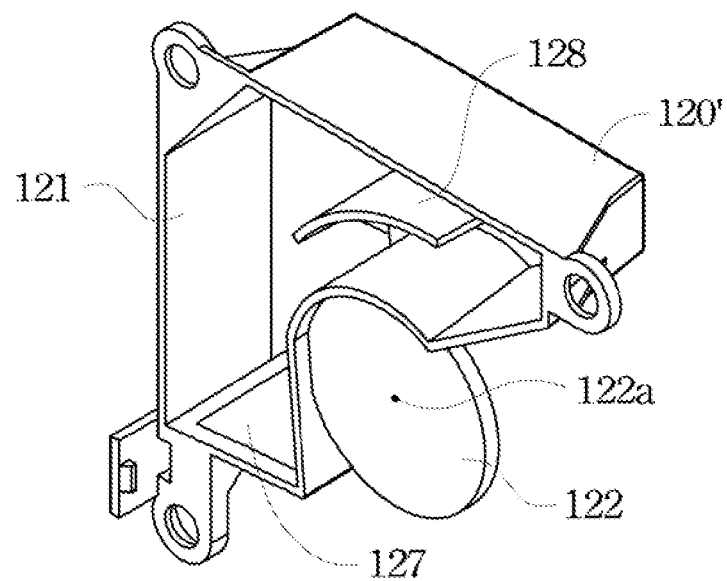
FIG. 3A illustrates a perspective view of an air guider according to another embodiment of this invention.
Figure 3B:
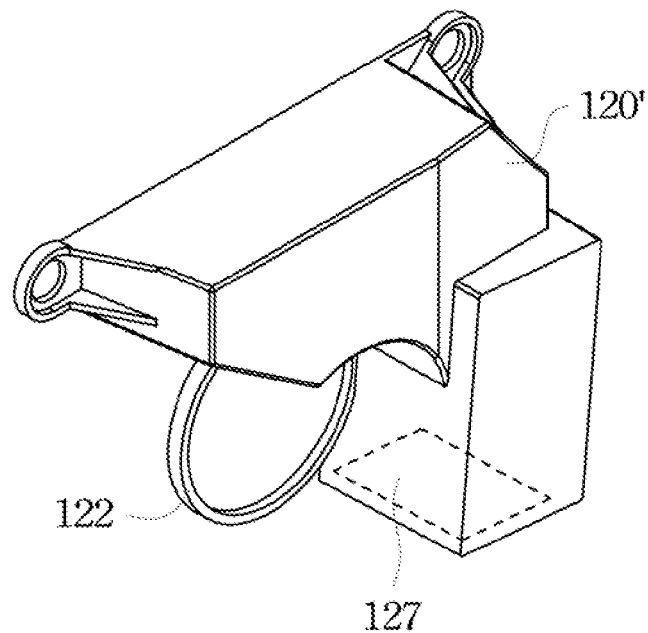
FIG. 3B illustrates a perspective view of the air guider of FIG. 3 from an opposite viewpoint.

Referring to FIGS. 3A and 3B, wherein FIG. 3A illustrates a perspective view of an air guider according to another embodiment of this invention. FIG. 3B illustrates a perspective view of the air guider of FIG. 3 from an opposite viewpoint. The air guider 120' is different from the air guider 120 in that an air output section 127 of the air guider 120' is located along a radial direction of the axial-flow fan while the air output section 124 of the air guider 120 is located along an axial direction of the axial-flow fan. When the high power component is located along a radial direction of the axial-flow fan, the air output section 127 of the air guider 120' provides desired airflows towards the high power component. The air guider 120' is also equipped with an arc air divider 128, which shares a common center 122a with the circular shield part 122, but the arc air divider 128 is not limited to such shape. One or more arc air dividers 128 may be designed within the air guider 120' according to actual demands so as to uniform the airflows within the air guider 120', thereby decelerating the airflows through the air guider 120' and decreasing the noises caused by the airflows. The air output section 127 can also be equipped with the deigns like the air divider 125 (not illustrated in the drawings) so as to divide the air output section 124 into two air output channels (124a; 124b) and uniform the airflows within each air output channel, thereby decreasing the noises caused by the airflows.

According to above-discussed embodiments, the heat dissipation device, consisting of the axial-flow fan and the air guider, are equipped with both functions of cooling the high power component and low power component, thereby occupying less space within an electronic device such that the electronic device can be designed with a compact size. Besides, the air guider is equipped with air dividers to uniform the airflows within the air guider, thereby decelerating the airflows through the air guider and decreasing the noises caused by the airflows, e.g. wind shear sounds.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A heat dissipation device comprising:
    an axial-flow fan having an air inlet and air outlet; and
    an air guider connected to and covering a portion of the air outlet, thereby exposing a remaining portion of the air outlet, and the air guider comprising:
        an air input section having an area smaller than that of the air outlet;
        an air output section having an area smaller than that of the air input section;
        at least an air divider disposed within the air output section to divide the air output section into a plurality of air output channels; and
        at least an arc air divider disposed within the air guider.

2. The heat dissipation device of claim 1, wherein the air guider further comprises a shield part aligned with a hub area of the axial-flow fan.

3. The heat dissipation device of claim 2, wherein the shield part and the hub area share a common shape.

4. The heat dissipation device of claim 2, wherein the shield part has a reflective surface, which is opposite to the hub area.

5. The heat dissipation device of claim 2, wherein the shield part is of a circular shape.

6. The heat dissipation device of claim 4, wherein the arc air divider and the shield part share a common center.

7. The heat dissipation device of claim 1, wherein the air guider comprises at least two fastening holes through which the axial-flow fan is secured.

8. The heat dissipation device of claim 1, wherein the air input section occupies a half of the air outlet.

9. The heat dissipation device of claim 1, wherein the air guider has a positioning member so as to secure the fan frame of the axial-flow fan.

10. The heat dissipation device of claim 9, wherein the positioning member has a hook member at an end thereof.

11. The heat dissipation device of claim 1, wherein the air output section is disposed along an axial direction of the axial-flow fan.

12. The heat dissipation device of claim 1, wherein the air output section is disposed along a radial direction of the axial-flow fan.

* * * * *